R. D. REED.
NUT LOCK.
APPLICATION FILED JUNE 13, 1912.

1,049,766.

Patented Jan. 7, 1913.

Witnesses:

Inventor
Ray D. Reed
By his Attorneys

UNITED STATES PATENT OFFICE.

RAY D. REED, OF ALBUQUERQUE, NEW MEXICO.

NUT-LOCK.

1,049,766.   Specification of Letters Patent.   Patented Jan. 7, 1913.

Application filed June 13, 1912. Serial No. 703,385.

*To all whom it may concern:*

Be it known that I, RAY D. REED, a citizen of the United States, residing at Albuquerque, in the county of Bernalillo and State of New Mexico, have invented certain new and useful Improvements in Nut-Locks, of which the following is a full, clear, and exact description.

This invention relates to nut-locks, the principal object thereof being to provide an improved means whereby an interlocking action between the bolt and the nut thereon will be obtained when the nut is screwed to its seat.

The invention involves the provision of a unitary split ring or washer adapted to be placed on the bolt between the nut and the part to be secured, so that when the nut is screwed to its seat the inner edge of said ring will be forced into locking engagement with the bolt. To this end I have provided a ring of this description of novel configuration and in combination therewith a nut adapted to so co-act with said ring as to substantially eliminate all possibility of inadvertent displacement of the nut when operatively disposed upon its bolt.

These and other objects of my invention will be hereinafter referred to and the novel elements and combinations of elements whereby they may be attained will be more particularly set forth in the claims appended hereto.

Figure 1:
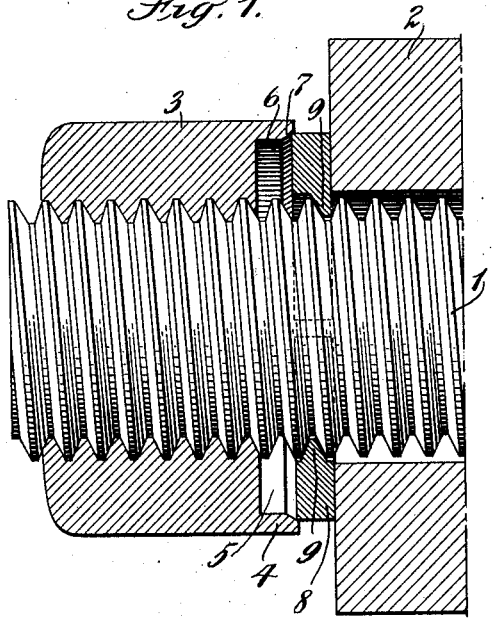
Figure 2:
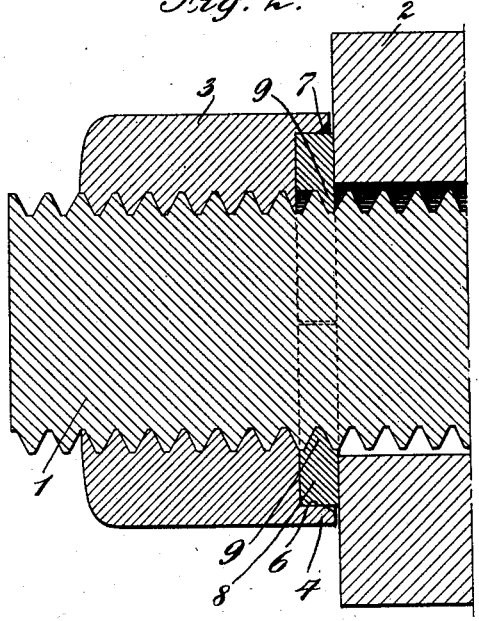
Figure 3:
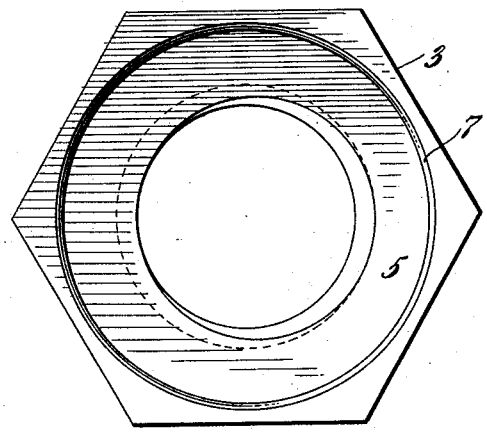
Figure 4:
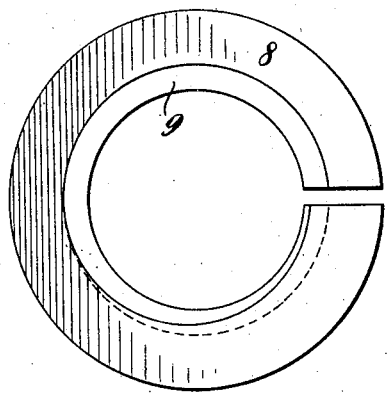

Referring to the drawings which form a part hereof and in which like reference characters designate like parts throughout the several views: Figure 1 is a sectional view of a preferred embodiment of my invention, the nut and locking ring being disposed upon the bolt in position preparatory to being set up and locked thereupon; Fig. 2 is a similar view showing the parts in locked engagement, the bolt in this view being in section; Fig. 3 is a view of the inner face of the nut, and Fig. 4 is a plan view of the locking ring.

Referring to Figs. 1 and 2 of the drawing, a portion of a bolt 1 is therein shown as extending through a member or plate to be fastened thereby. The nut for said bolt has been broadly designated 3 and is provided with an annular shoulder or abutment 4, formed by recessing the inner face of the nut as at 5. The major part of the inner wall 6 of the shoulder is preferably disposed substantially parallel to the axis of the bolt hole through the nut, but the outer edge of this wall is, in the preferred form of my device, tapered or flared outwardly as shown at 7. A unitary split locking ring or washer 8 preferably of flexible resilient material is adapted for reception into the recess 5, said ring being preferably flat and relatively thin. This ring has initially formed therein a thread-like portion 9 around the interior surface thereof, which portion preferably corresponds substantially to a single turn of the thread of the bolt. The outer diameter of said ring is also preferably slightly less than the greatest diameter of the flaring portion 7 of the wall 6; while it is of materially greater diameter than the smallest diameter of said flaring portion, or in other words of the substantially cylindrical or body portion of said wall; while the peripheral wall of said ring is preferably substantially parallel to the axis of the threaded bolt opening therein.

The parts are assembled as shown in Fig. 1, the ring 8 being turned up on the bolt until it engages plate 2, after which nut 3 is turned or set up thereon until the flaring portion 7 thereof engages the outer edge of the ring. If now the nut 3 be still further set up, the frictional engagement between the nut and ring will cause the ring to be still further turned up on the bolt until it is firmly wedged against the plate 2, after which the ring will cease to turn. Thereafter each turn of the nut progressively constricts the ring by forcing its free ends toward each other until the ring is of sufficiently small diameter to be received bodily within the recess, when the nut may be screwed to its seat; the parts finally assuming the positions shown in Fig. 2. This constriction of the ring forces the inner threaded edge thereof into firm engagement with a thread of the bolt, the outer periphery of said ring engaging the shoulder or abutment and exerting a pressure thereagainst which is normal to substantially all points in the contacting surfaces. By reason, further, of the disposition of the radial lines of pressure with respect to the axis of the bolt, substantially all tendency for the ring and nut to become inadvertently displaced with respect to each other, is eliminated. I particularly desire to emphasize this feature which I believe is distinctively novel; since in no device of this character with which I am acquainted is there such a configuration of the nut and its locking ring as to cause the latter to press outwardly against the nut surface in such manner that the pressure is normal, at substantially all points of contact, to both of the contacting surfaces, while the lines of pressure are at the same time perpendicular to the axis of the bolt. As a result of this disposition and arrangement of parts there is no tendency (particularly when the device is subjected to vibration) for the nut to be worked loose upon the bolt by a component of the ring constricting pressure acting in the direction of the length of the bolt; since no such component is developed, all pressure being normal or perpendicular to the bolt axis. It is to be noted too, that the threads are initially formed in the ring; that is to say, these threads are not formed by the pressure of the bolt threads thereagainst which obviously tends to deform the bolt threads,—an undesirable feature existing in certain devices of this character. I am aware, however, that it is old to provide devices somewhat analogous to that herein described which are adapted to be seated in a cavity in a nut when applied to a bolt; but in all such devices with which I am acquainted it has been the custom to provide a taper upon the outside of the locking device or ring and a corresponding taper throughout the entire annular wall of the recess in the nut which receives the same. It is, further, highly desirable that the locking ring be driven into engagement with the bolt without twisting or otherwise distorting the ring when driving the nut home, the ring being in my construction preferably flat initially and remaining so.

In concluson, I desire to state that I am aware of various changes and modifications which may be made herein within the purview of my invention, and I hence desire to be limited only by the scope of the appended claims. By way of example, it is obvious that the inner edge of the locking ring need not be threaded as herein shown, but for reasons hereinbefore pointed out I prefer to employ a threaded ring.

An additional advantage of the present construction resides in the fact that when the nut is turned loose from the bolt, as by means of a wrench, the washer normally remains within the recess in the forward or under face of the nut, this being due, again, to the fact that the pressure of the washer against the shoulder on the face of the nut is exerted along radial lines which are substantially perpendicular to the axis of the bolt. Where the lateral wall of the recess in the nut is tapered for the entire depth thereof as in certain known devices of this character, the instant that the nut is loosened there is a strong tendency for the washer to back out of the recess so that the construction of the locking ring and nut herein described affords a plurality of advantages, in that not only does it afford an improved lock, but it lessens the liklihood of losing the washer when the nut and washer have been removed from the bolt; and it further permits of the simultaneous freeing of the bolt from both its nut and lock washer, when desired. The washer can thereafter, of course, be readily pried out of its nut preparatory to reapplying these parts to the bolt.

Having described my invention, I claim:

1. A nut lock comprising a nut having in one face thereof a recess of greater diameter than the threaded bolt hole in said nut, said recess having the lateral wall thereof substantially parallel to the axis of said bolt hole, and a unitary split locking ring the diameter of which is larger initially than the diameter of the portion of the wall of said recess which engages therewith, said ring having a thread initially provided upon its interior edge which is adapted to conform closely to the thread of the bolt to which it is to be applied, the peripheral surface of said ring, when in its locking position in said recess being adapted to press outwardly against the said lateral wall of said recess, the pressure being normal to both the contacting surface of said lateral wall and the surface of said ring which is in engagement with said wall, said pressure being exerted in radial lines which are substantially perpendicular to the axis of the bolt, whereby to substantially eliminate all tendency for said ring and nut to become inadvertently displaced with respect to each other.

2. A nut lock comprising a nut having in one face thereof a recess of greater diameter than the threaded bolt hole in said nut, said recess having the lateral wall thereof substantially parallel to the axis of said bolt hole, and a unitary split locking ring the diameter of which is larger initially than the diameter of the wall of said recess which engages therewith, the peripheral surface of said ring, when in its locking position in said recess, being adapted to press outwardly against the lateral wall of said recess, the pressure being normal to both the contacting surface of said lateral wall and the surface of said ring which is in engagement with said wall, said pressure being exerted in radial lines which are substantially perpendicular to the axis of the bolt, whereby to substantially eliminate all tendency for said ring and nut to become inadvertently displaced with respect to each other.

In witness whereof, I subscribe my signature, in the presence of two witnesses.

RAY D. REED.

Witnesses:
THOMAS ANDERSON,
H. B. RAY.

Copies of this patent may be obtained for five cents each, by addressing the "Commissioner of Patents, Washington, D. C."